(12) United States Patent
Coody et al.

(10) Patent No.: US 10,079,464 B1
(45) Date of Patent: Sep. 18, 2018

(54) SYSTEMS AND METHODS FOR GENERATING ELECTRIC POWER WITH AN ELECTRIC MOTOR

(71) Applicant: Chris Coody, Crawford, TX (US)

(72) Inventors: Chris Coody, Crawford, TX (US); Boris Del Valle Alonso, Waco, TX (US)

(73) Assignee: Chris Coody, Crawford, TX (US)

( * ) Notice: Subject to any disclaimer, the term of this patent is extended or adjusted under 35 U.S.C. 154(b) by 0 days.

(21) Appl. No.: 15/905,405

(22) Filed: Feb. 26, 2018

Related U.S. Application Data

(63) Continuation of application No. 15/715,101, filed on Sep. 25, 2017, now Pat. No. 9,941,651.

(51) Int. Cl.
| | | |
|---|---|---|
| *H02K 13/00* | (2006.01) | |
| *H01R 39/60* | (2006.01) | |
| *H02K 47/16* | (2006.01) | |
| *H02K 53/00* | (2006.01) | |

(52) U.S. Cl.
CPC ............. *H01R 39/60* (2013.01); *H02K 47/16* (2013.01); *H02K 53/00* (2013.01); *Y10S 74/09* (2013.01)

(58) Field of Classification Search
CPC .... H02K 13/003; H02K 13/006; H02K 13/10; H02K 5/148; H02K 13/00; H02K 23/38; H02K 23/20; H02K 13/04
USPC .................. 310/128, 148, 231, 248
See application file for complete search history.

(56) References Cited

U.S. PATENT DOCUMENTS

| | | | |
|---|---|---|---|
| 381,968 | A | 5/1888 | Tesla |
| 416,194 | A | 12/1889 | Tesla |
| 5,485,049 | A | 1/1996 | Shannon et al. |
| 5,734,219 | A | 3/1998 | Horski et al. |
| 5,772,498 | A | 6/1998 | Neubert et al. |
| 5,780,952 | A | 7/1998 | Lau et al. |

(Continued)

FOREIGN PATENT DOCUMENTS

| | | |
|---|---|---|
| WO | WO2014167551 | 10/2014 |
| WO | WO2016146908 A1 | 9/2016 |

*Primary Examiner* — Thanh Lam
(74) *Attorney, Agent, or Firm* — Regitz Mauck PLLC; Mike Regitz; Dustin Mauck

(57) ABSTRACT

The present invention uses a traditional electrical motor with a rotor to generate electricity or power. By manipulating the magnetic fields within a rotor, large amounts of electricity are generated by the rotation of the rotor within an external magnetic field. Oppositely charged rare-earth magnets are placed around the rotor to create a strong magnetic field that the rotor can spin or rotate within. A battery or other power source supplies power to the rotor at positive and negative terminals (brushes) that are connected to commutator. The positive and negative terminals contact the commutator close to each other, such that only a few windings or coils are charged or magnetized, and the remaining windings or coils are free to generate electricity within the external magnetic field. The few coils that are charged in combination with the external magnetic fields create sufficient rotation, while enabling the remaining "free" coils to generate electric power. This power or electricity that is generated is then collected at a terminal about 150-200 degrees from the positive and negative terminals from the power source. The rotor may be offset or closer to one set of magnets, which further improves power generation.

20 Claims, 12 Drawing Sheets

(56) References Cited

U.S. PATENT DOCUMENTS

| | | | |
|---|---|---|---|
| 5,982,072 A | 11/1999 | Sung | |
| 8,421,380 B2 * | 4/2013 | Lau | H02K 23/20 |
| | | | 310/248 |
| 8,986,076 B2 | 3/2015 | Yang | |
| 2004/0061406 A1 * | 4/2004 | Yokota | H02K 1/17 |
| | | | 310/216.004 |
| 2009/0009023 A1 * | 1/2009 | Weigold | H02K 23/20 |
| | | | 310/198 |
| 2012/0133240 A1 * | 5/2012 | Roos | H02K 13/10 |
| | | | 310/233 |
| 2013/0162087 A1 | 6/2013 | Ishikawa et al. | |
| 2014/0084875 A1 | 3/2014 | Bender et al. | |
| 2014/0159527 A1 | 6/2014 | Kawashima et al. | |

* cited by examiner

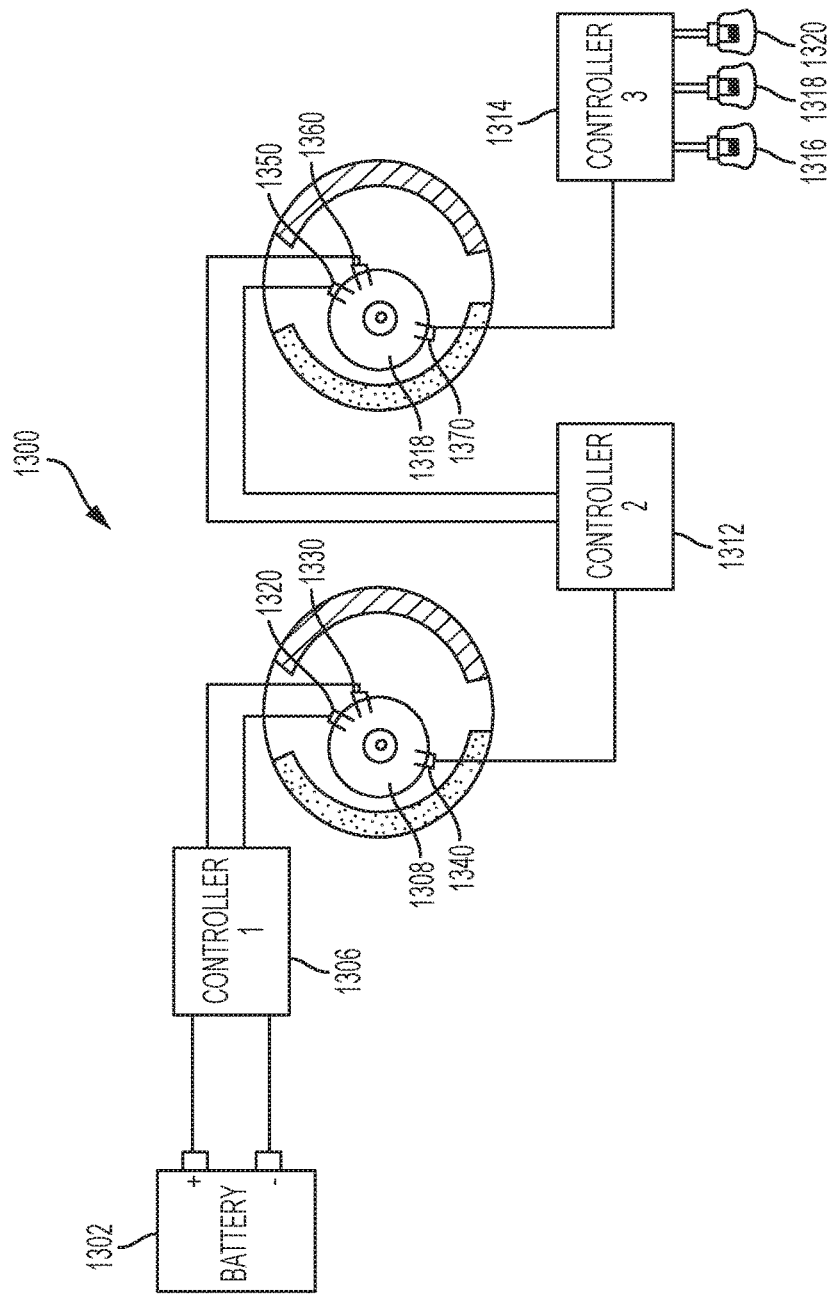

SYSTEMS AND METHODS FOR GENERATING ELECTRIC POWER WITH AN ELECTRIC MOTOR

PRIORITY CLAIM

This application claims priority and is a continuation application of U.S. patent application Ser. No. 15/715,101 filed on Sep. 25, 2017.

TECHNICAL FIELD

The present invention relates generally to electrical power generation and, more specifically, to a generator that uses an electric motor to generate electricity.

BACKGROUND OF THE INVENTION

Many devices have been invented since the mid 1800s to utilize the electric current generated from moving a copper coil in a magnetic field. This relationship, whether in an alternator, electric motor, or generator has become a staple of our life today, especially in First and Second World countries. The inability to supply a consistent source of electricity has restricted the ability to have a more productive life in many Third World countries because of the lack of dependable lighting for schools and hospitals, refrigeration, water pumps, etc. Until now, power generation required the use of some force, such as that provided by an internal combustion engine, whether it be gas or diesel, or some less reliable source such as solar or wind power, to turn a generator. Hydro-generation is more reliable, but restricted to a powerful and consistent water source such as a dam or stable river. The above-mentioned sources have trouble supplying a consistent amount of power due to cloudy days for solar, no or low wind days for wind power, flooding rivers or drought for hydro power, and the difficulty of supplying gas or diesel in remote areas for generators with an internal combustion engine.

First and Second World countries have overcome the consistent supply problem by creating large power plants that use some source of fuel, whether that be natural gas, coal, nuclear, or in some cases diesel to turn water to steam and drive large generators. There are also hydroelectric dams that use the fall of the water to spin large generators.

While the supply of the electricity is consistent from these large power generators, an elaborate system of power networks is required to deliver the electricity to the consumer. For decades, this "grid" system has supplied a consistent and reliable source of electricity to people that had access to it. However, the system is fragile and susceptible to attack from an EMP (electromagnetic pulse) delivered by a terrorist organization or a strong solar discharge such as the Carrington Event in 1859, which could destroy our electrical system today. The grid is also in danger of failure because of the age of the system and the strain that an ever-increasing population is putting on it. Many cities such as Austin, Tex. are supplementing the purchases of solar systems for its citizens just to reduce the burden on the grid.

Another major problem with power plants is the amount of pollution released in the form of $CO_2$ emissions from coal and gas plants and the danger that a core meltdown could provide with a nuclear plant, such as the Fukushima, Three Mile Island, or Chernobyl power plants. Fukushima is still pouring out radioactive water into the Pacific Ocean. The waste products of power generation have driven the recent push for Green Energy. Our World cannot afford another Fukushima and there is great concern that the burning of fossil fuels adds to Global Warming.

What the world needs is a clean, cost effective, power source that (1) is independent of any elaborate delivery mechanism or system, and (2) can provide a steady source of electricity regardless of weather conditions, geographic location, or fuel supply. A portable, efficient system could be used for power generation at home, at an oil and gas site, or even for use in an electric car. Despite all the benefits from improved electric generator designs, Applicant is unaware of any designs that meet these requirements. The misunderstanding of the relationship of copper coils, such as in a rotor, and the magnetic fields that can be generated in them with an electric current has prevented any individual from fully utilizing them until now. There is no need for external forces such as wind, fossil fuels, or even the sun to generate electricity. There is enough electricity supplied within multiple coils to self-operate and produce significant electric power if they are energized in a particular manner.

BRIEF SUMMARY OF THE INVENTION

In view of the foregoing, the present invention discloses an improved electric generator derived through a unique method of magnetic field manipulation. This improved generator design which, because of its small size and design features for supplying more electricity than it consumes during operation, provides an electric generator that allows the owner to be independent of any outside fuel source or power supply and allows them to carry their power source with them and to occupy remote or desolate areas. It would also allow a user to no longer be dependent on a supply of gas or diesel when combined with an electric motor for a car. This has huge implications when extended to maritime situations, military uses, oil and gas use, and even space travel. The present invention further discloses a way to safeguard the population by eliminating the reliance on the current power grid and thus eliminating a potential national security risk if an EMP were to be used by some hostile element. The present invention discloses a method for producing a generator that, through the use of an improved design, allows the use of generators in confined spaces.

The present invention is an electric generator, which addresses the problem of fuel source, portability, autonomy, and cost. It affords its user the ability to produce his or her own electricity for travel or home use faster, in a more cost-effective manner, and with more enhanced safety than any prior version of generator known.

The present invention uses a traditional electrical motor with a rotor to generate electricity or power. By manipulating the magnetic fields within a rotor, large amounts of electricity are generated by the rotation of the rotor within an external magnetic field. In some embodiments, oppositely charged rare-earth magnets are placed around the rotor to create a strong magnetic field that the rotor can spin or rotate within. One or more south-pole magnet(s) on one side of the rotor and one or more north-pole magnet(s) on the other create this strong magnetic field. A battery or other power source supplies power to the rotor at positive and negative terminals (brushes) that touch or are connected to the commutator. In prior motors or generators, these terminals or brushes were connected approximately 180 degrees from each other on the commutator. However, in the present invention the positive and negative terminals are connected close to each other, which only charges a few of the windings or coils, allowing most of the windings or coils to be free to generate electricity. These remaining uncharged windings or coils generate power or electricity as the rotor moves through the magnetic field. This power or electricity that is generated is then collected through a brush about 150-200 degrees from the negative terminal from the battery. In some embodiments, the power generated here is four times the amount that is supplied by the battery.

For various configurations and types of rotors, the positioning of the positive and negative terminals may be adjusted for peak performance, but they remain close on the commutator. In some embodiments, a rotor with between 8-24 windings or coils operates best when the negative terminal of the battery is connected to the commutator at the edge of the external north-pole magnet(s) and corresponding magnetic field and the positive terminal is connected to the commutator at a location inside the magnetic field created by the external north-pole magnet(s). Depending upon the configuration of the rotor and magnetic field, the positive and negative terminals (brushes) may need to be adjusted for additional gain.

The rotor of the present invention may be offset within the external magnetic field so that it is much closer to the south-pole magnet(s) than the north-pole magnet(s). By enhancing the attraction between the rotor and the south-pole magnet(s), the coils or windings within the rotor generate additional rotation and electricity or power.

The practical applications of the present invention are endless. In some embodiments, multiple batteries can be used so that one battery is recharging, while the other battery supplies the power necessary to spin or rotate the rotor. The additional power collected from the rotor can supply power to a load or power an additional rotor. In this design, the electrical generator can supply continuous power to a load without a connection to an external power source or the use of fuel or gas.

In some embodiments, a smaller battery can be used to supply the power necessary to spin or rotate the rotor. Then the additional power created by the rotor can supply or recharge a larger battery. This design could be used in an electric vehicle, where the smaller battery can be charged by the alternator and the bigger battery can be used to provide electric power to operate the vehicle.

In other embodiments, multiple rotors can be connected in series to power one or more loads that the smaller battery could not power on its own. Specifically, the smaller battery can be used to supply the power necessary to spin or rotate a first rotor. Then the additional power created by the first rotor can supply or recharge a second rotor. The output of this rotor would be multiples higher than the smaller battery, such that a smaller battery or power source could power a larger load or multiple loads.

Numerous features of the present invention significantly improve the generation of electricity. First, the close placement of the positive and negative terminals on the commutator charges and magnetizes only a small number of coils for rotating the rotor. The majority of coils are then free of charge to rotate within the external magnetic field and generate electric power. Second, the small number of charged coils interact with the external magnetic field to provide sufficient energy to rotate the rotor for generating the electric power. Third, the use of rare-earth magnets to create a stronger external magnetic field improves the rotational speed of the rotor and the current generation of the free windings. Lastly, the positioning of the generation terminal at the edge of at least one charged rare-earth magnet improves generation, since the interaction between the free coils and these magnets is strongest at the edges of the magnets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 13 shows an alternative electric generator design according to embodiments of the invention.

DETAILED DESCRIPTION OF THE INVENTION

The benefits provided by embodiments of the generator include improved methods of manipulating magnetic fields for power generation. In some embodiments, a common AC or universal motor is modified to function as a generator connected to a power source, such as a battery.

Figure 1:
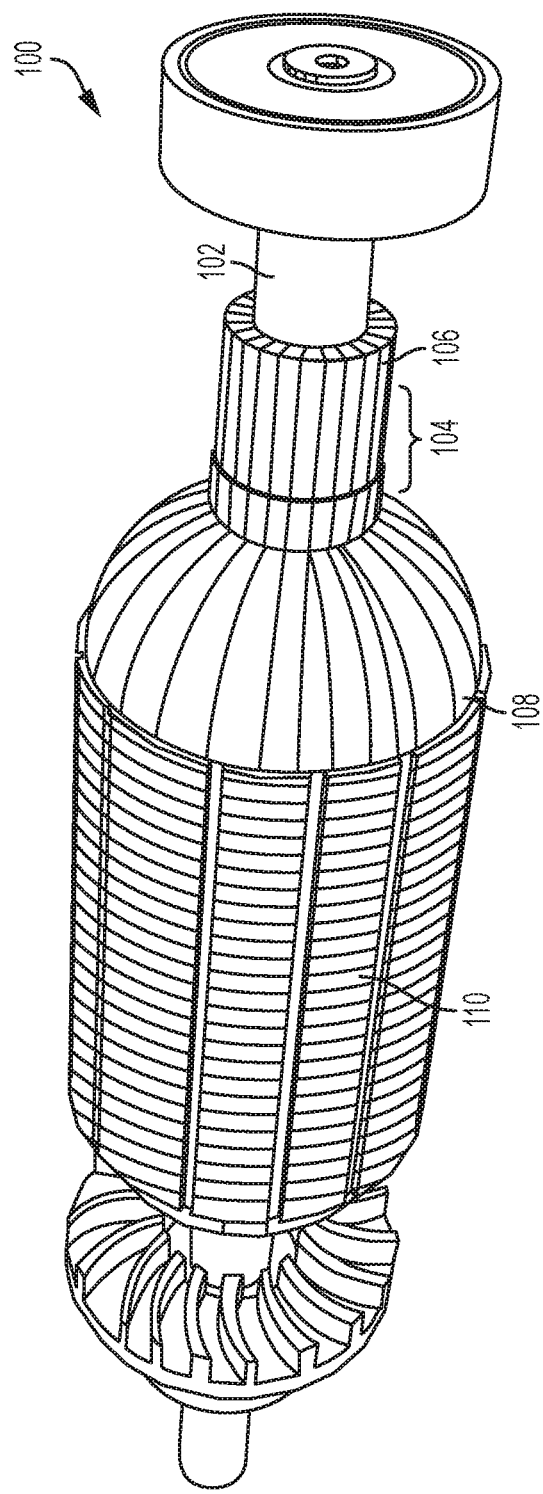
FIG. 1 shows a traditional rotor for an electric generator.

In some embodiments, the generator may use a traditional rotor that is used in electric motors, such as a treadmill, electric saw, or grinder. FIG. 1 illustrates a common rotor 100 with a shaft 102 that is designed to rotate around a longitudinal axis that runs down the center of the shaft 102. The rotor 100 may rotate in a clockwise or counter-clockwise direction. A commutator 104 surrounds the shaft 102 and consists of a number of strips or contacts 106 for connection to a power source. The rotor 100 also includes coils/windings 108 that comprise copper wiring that is wound throughout a portion of the length of the rotor 102. Generally, coils/windings 108 may be copper wires that are laid in coils usually wrapped around a core, so as to form magnetic poles when energized with current. These separate coils/windings 108 are connected to specific contacts 106 of the commutator 104, such that electricity passes from the copper wiring to the commutator 104 and vice versa. The armature core 110 holds the coils/windings 108, such that the coils/windings 108 are wrapped around these sections of the armature core 110. In some embodiments, there are sixteen contacts and eight coils or twelve contacts and six coils. In other embodiments, there are 24 contacts and twelve coils. FIG. 1 is provided as an exemplary embodiment of a common rotor 100, but other configurations are within the scope of this invention.

The coils/windings are used to generate current through movement in a magnetic field. While this invention is not limited to a specific rotor design, it is helpful to recognize that in some rotors, if the coils or windings of the rotor were laid out, they would resemble something akin to a flower with an outer row of sepals and an inner row of petals. Each individual petal or sepal being one half of a coil. Therefore, when the rotor is assembled, it has an outer circle of coils (the sepals) and an inner row of coils (the petals). The coils are connected to each other in a pattern. The present invention uses a few of the coils to produce sufficient rotational movement of the rotor (through connection to a power source), while the remaining coils can be used for current generation. Through movement within the magnetic field, the coils that are not occupied for movement of the rotor can generate current.

Copper wire may be used in the coils due to its inherent properties. Specifically, copper has a single valence electron in its outer shell of electrons. It is commonly known that elements with a single valence electron are "willing" to give them up in some fashion because it helps to stabilize the atom. In the present invention, this single valence electron of copper is excited in a magnetic field and generates the electricity or power. Similar to gases that become excited when heat or pressure is applied, the copper within the coils become excited and activated, thereby producing electricity as valence electrons are freed or harvested. With more free copper windings (i.e., windings not occupied in a magnetic field and charged by the power source), the rotor is able to generate much more electricity.

Figure 2:
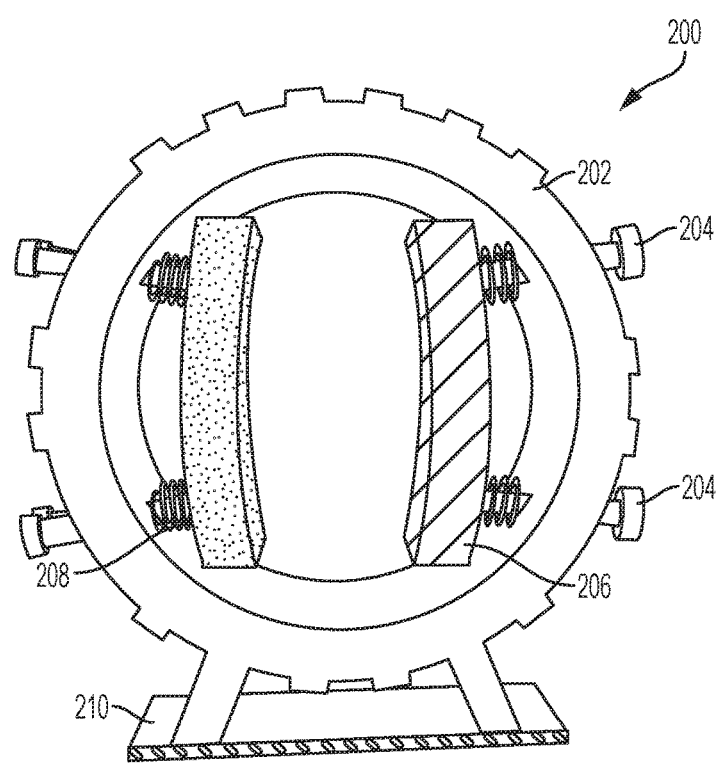
FIG. 2 shows a housing with rare-earth magnets for holding the rotor for an electric generator according to embodiments of the invention.

FIG. 2 illustrates a housing 200 for an electric generator according to embodiments of the invention. The housing 200 is designed to hold at least two rare-earth magnets external to the rotor 100. The rare-earth magnets may be shaped similar to an arc or semi-circle to match the curvature of the rotor (FIG. 2) or may be straight magnets that enclose the rotor in a magnetic field. In some embodiments, the housing 200 consists of a pipe or circular casing 202 surrounding the rotor 100. Bolts, screws, anchors, or other similar components 204 are drilled through the circular casing 202 and attached to the magnets 206 and 208 to hold them in place. The anchors 204 may be used to hold the magnets 206 and 208 in an arched configuration around the rotor. In other embodiments, the magnets may be straight and placed on each side of the rotor 100 to create the external magnetic field. A base 210 holds the circular casing 202 in an upright position. The magnet(s) 206 may comprise a single or multiple north-pole magnet(s), while the magnet(s) 208 may comprise a single or multiple south-pole magnet(s). In some embodiments, the magnets 206 and 208 comprise rare-earth magnets, such as samarium cobalt (SmCo) or neodymium-ion-boron (NdFeB) to improve the strength of the magnetic field. The housing 200 is designed to allow the rotor 100 to rotate within a magnetic field created by the north and south-pole magnets 206 and 208. The magnets 206 and 208 may be divided into all north on one side and all south on the other with the rotor 100 in between. Though the end caps have been removed for easier viewing, the rotor may be fastened securely in some type of cradle or frame that prevents it from being pulled towards one of the magnets. The brushes may also be securely fastened to this cradle or frame to ensure that rotor and brushes remain in the proper position.

Figure 3:
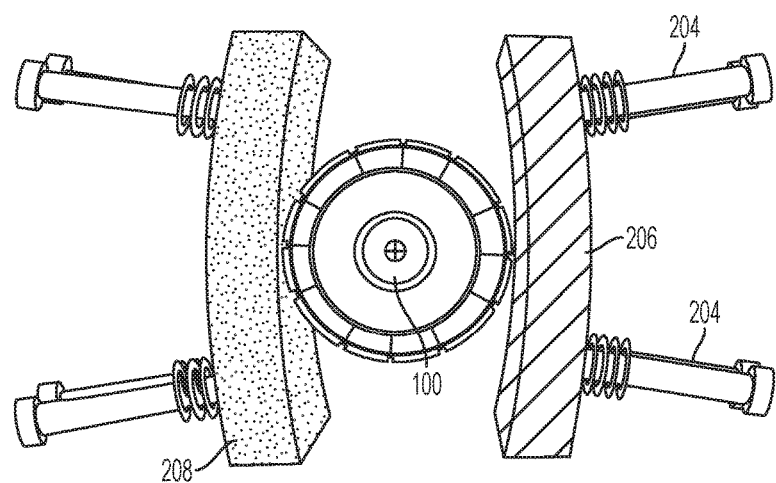
FIG. 3 shows the placement of the rotor with respect to rare-earth magnets according to embodiments of the invention.
Figure 4:
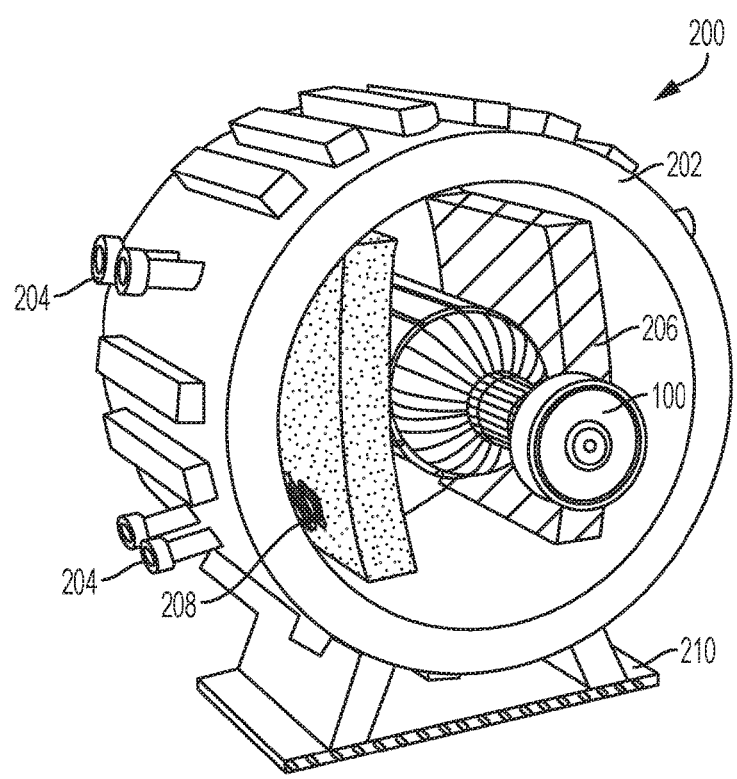
FIG. 4 shows an alternative view of the placement of the rotor in a housing with rare-earth magnets according to embodiments of the invention.

FIG. 3 illustrates the placement of the rotor 100 within a housing, such that the rotor 100 rotates within the magnetic field created by the magnets 206 and 208. The circular casing 202 has been removed in this figure to show the placement of the rotor within the housing 200, indicating that the pipe or circular casing 202 may be absent if the magnets 206 and 208 can be held in place by another means. The magnetic attraction between the external magnetic field and the rotor 100 is strong, so alternative embodiments for this housing must be strong enough to hold the rotor 100 in place within the magnetic field. The anchors 204 are used to hold the magnets 206 and 208 into a semi-circular position around the rotor 100. The anchors may also hold the magnets 206 and 208 in a horizontal configuration on each side of the rotor 100. The rotor 100 is offset within the magnetic field such that it is closer to magnet(s) 208 than magnet(s) 206. This feature increases the electrical output of the generator. In this embodiment, the rotor 100 is closer to the south-pole magnet(s) 208 than the north-pole magnet(s) 206. FIG. 4 is an alternative view that illustrates the placement of the rotor 100 within a housing 202, such that the rotor 100 rotates within the magnetic field created by the magnets 206 and 208. Similar to FIG. 3, the rotor 100 is offset within the magnetic field such that it is closer to magnet(s) 208 than magnet(s) 206.

The customary use of a motor of this design is to use the motion of the rotor to move something, such as a saw blade or a grinding wheel. The object of this traditional use is to create or generate a high rpm (revolutions per minute) to move or grind most effectively or generate a strong rotational force. However, the present invention creates power or electricity by harnessing the electricity created from the rotation of the rotor through the magnetic field created by the rare-earth magnets. As the rotor spins within the magnetic field, the copper coils/windings are excited and generate electricity that can be collected.

This configuration has been shown to produce significant power generation. It is similar to using a magnifying glass to focus sunlight to burn paper. The magnifying glass can be placed at various distances from the paper to shine light on it, but only the correct distance from the paper will focus the sunlight well enough to ignite the paper. Similarly, this configuration has been shown to be the most efficient for current generation. Since the input from the power source is only provided to charge a small portion of the windings or coils, the remaining windings or coils not charged by the power source operate to generate power or electricity as the rotor moves through the magnetic field. Adjustments can be made to the placement of the external magnets, the size and location of the rotor, connections of the positive, negative, and generation terminals, and other variables to improve power generation.

The output or generation is further increased by offsetting the rotor in between the magnets. In this embodiment, the rotor is much closer to the south-pole magnet(s) 208 than the north-pole magnet(s) 206. The offset of the rotor 100 towards the south-pole magnet(s) 208 creates a greater interaction between the rare-earth magnets and the magnetic fields generated by the rotor 100. Customary electric motors center the rotor between the south-pole and north-pole magnets, however, electricity generation is enhanced by moving the rotor closer to the south-pole magnet(s). This enhancement is caused by the fields of the rotor "pressing" against the field of the rare-earth magnets and increasing the effect of field energization on the valence electrons. This leads to (1) greater repulsion of the negative south-pole magnets, which increases rotation, and (2) increased electricity or power at the generation site. The interaction of the magnets occurs most strongly at their edges (i.e., the edge of the south-pole magnetic field) and the zone of interaction between the edge of the external magnetic field and the rotor, which is where we see an increased output. As discussed below, the electricity or power is harnessed closer to the edges of these magnets due to this interaction, which can be observed with a special lens material called green magnetic field viewing film.

The housing can be made of a durable plastic, but other resilient materials, such as various metals, plastics, or glass may be substituted. Various shapes and thicknesses of rare-earth magnets may be used, but due to their strength, they must be securely fastened within or otherwise anchored to the housing. Other types of magnets may be used in some cases, however, performance may not be optimal, and the economics of some alternative approaches may outweigh the benefits of the present invention.

Figure 5:
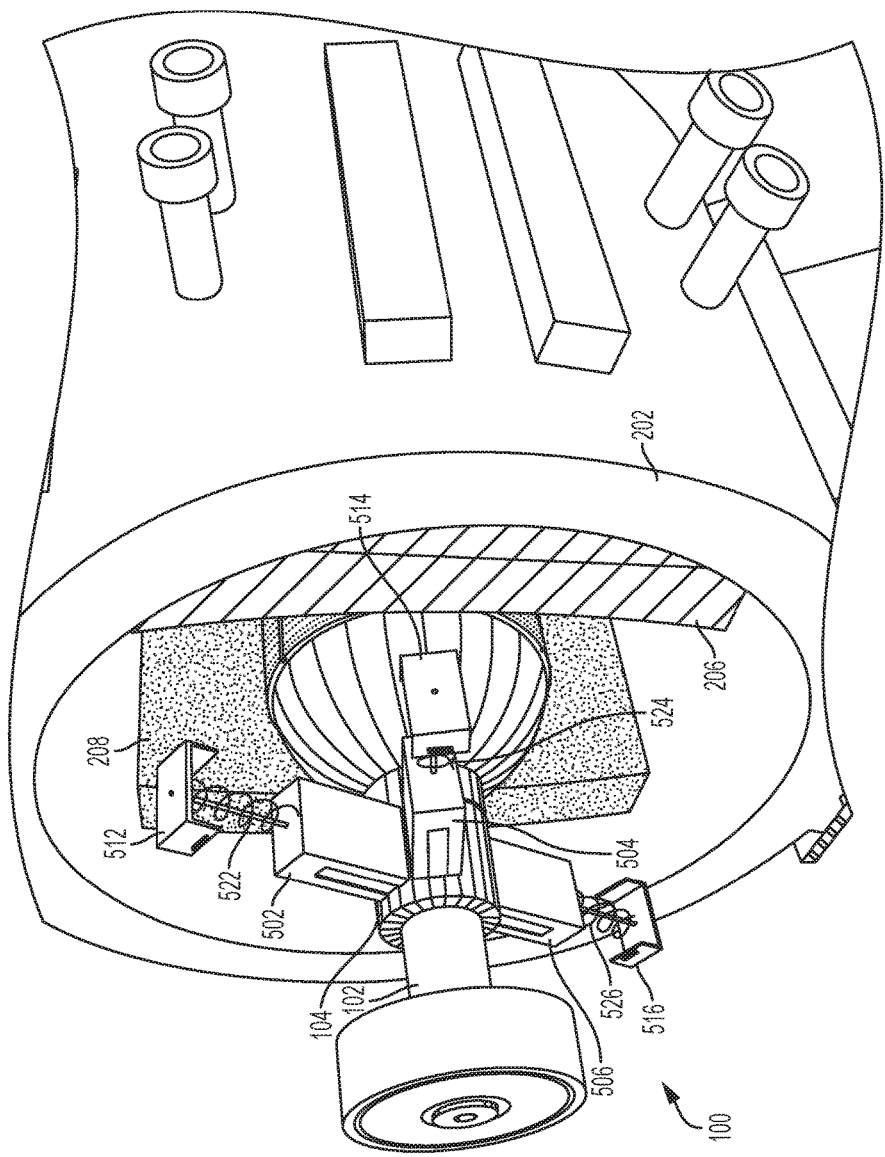
FIG. 5 shows an alternative view of the placement of the rotor in a housing with rare-earth magnets according to embodiments of the invention.

FIG. 5 illustrates the placement of the rotor 100 within the housing 200 and highlights the configuration of the brushes 502, 504, and 506 and the commutator 104. In this embodiment, there are three brushes 502, 504, and 506 that contact the commutator 104 to either provide or capture electric power from the rotor 100. Traditional brushes 502, 504, and 506 are used with corresponding springs 522, 524, and 526 and brackets 512, 514, and 516. The springs 512, 514, and 516 are used to apply the brushes 502, 504, and 506 to the commutator 104, so that electricity can flow into and out of the commutator 104. The first bracket 512 and brush 502 combination is connected to the negative terminal of a battery, while the second bracket 514 and brush 504 combination is connected to the positive terminal of a battery. This creates a closed circuit with the battery and indicates that the voltage supplied from the battery flows to the commutator 104 through these brushes 502 and 504. The springs 522, 524, 526 keep the brushes 502, 504, 506 in contact with the commutator 104, but provide flexibility while the rotor 100 is spinning. Brushes are not required in the present invention, which can be applicable with a brushless electric motor. Other means of supplying power to the commutator and other types of power sources are within the scope of the present invention.

Figure 6:
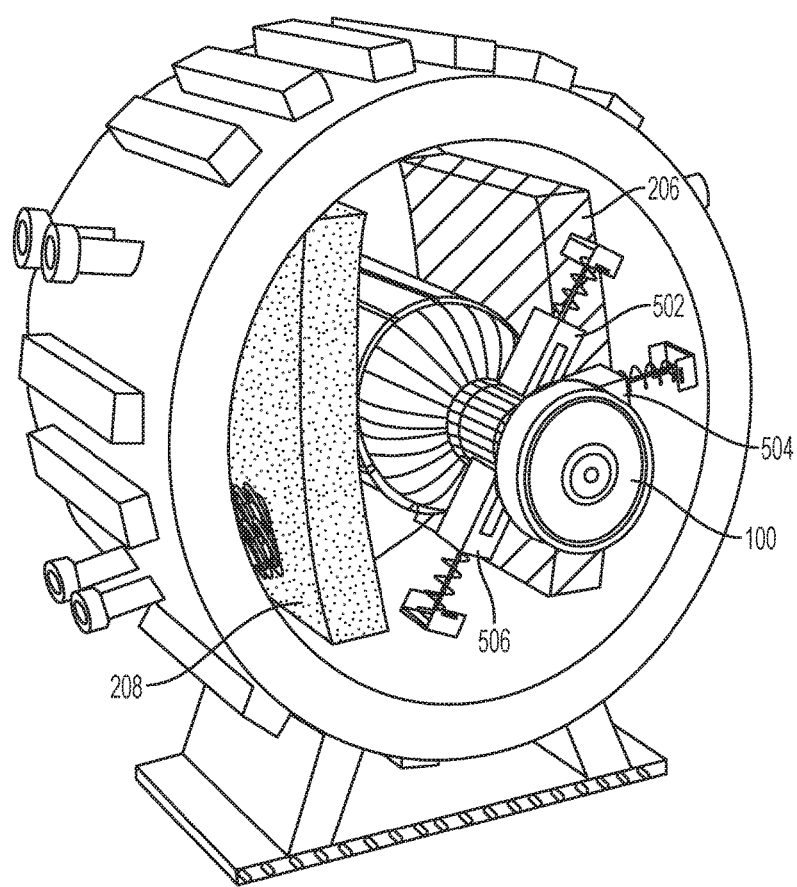
FIG. 6 shows an alternative view of the placement of the rotor for an electric generator in a housing with rare-earth magnets according to embodiments of the invention.

In prior motors, the brushes 502 and 504 are connected to the battery from opposite sides of the rotor 100 (180 degrees apart), but the connections are close in this device. As discussed below, this feature of the present invention improves the power output. The third bracket 516 and brush 506 combination can be used to harness the electrical power from the device. As the rotor 100 rotates within the magnetic field it generates electricity at this brush 506. FIG. 6 illustrates an alternative view of the placement of the rotor 100 within the housing 200 and highlights the configuration of the brushes 502, 504, and 506 and the commutator 104. This illustration shows that the rotor 100 remains offset within the magnetic field, such that it is closer to the magnet(s) 208 than the magnet(s) 206. In a preferred embodiment, the first brush 502 is connected such that it is aligned or adjacent to the edge of the north-pole magnet(s) 206, while the second brush 504 is connected such that it is aligned within the north-pole magnet(s) 206. This placement of the negative and positive terminals has been shown to improve power output from the generator.

The positive and negative terminals that are connected to the power source (battery) are next to each other rather than being opposite of each other on the commutator. In a preferred embodiment, the positive and negative terminals are placed approximately 5-40 degrees apart on the commutator with the negative terminal at the upper edge of the north-pole permanent magnetic field and the positive terminal within the field of the north-pole magnet that is created by the north-pole magnet(s) 206. In some embodiments, said positive and negative terminals are 10-30 degrees apart. This design generates a smaller magnetic field within the rotor sufficient to spin the motor, but one that does not occupy all coils of the rotor. This allows the remaining windings of the rotor to create electricity during the rotational movement of the rotor. Specifically, only a few windings are occupied by the electrical charge of the power source, so the remaining windings are free to generate electricity. In prior motors, the positive and negative terminals are placed at opposite ends of the rotor or at approximately 180 degrees apart, which occupies the majority of the rotor in a magnetic field. More specifically, in prior motors approximately 40-45% of the rotor becomes positively charged and 40-45% becomes negatively charged, giving the greatest rotational force possible. However, these prior configurations are unable to produce the electrical power of this configuration because there are fewer free (not charged) windings for generating electricity.

As mentioned above, copper wires may be used in the coils. The single valence electron of copper becomes excited in a magnetic field and generates the electricity or power. With more free copper windings, the rotor is able to generate much more electricity.

Figure 7:
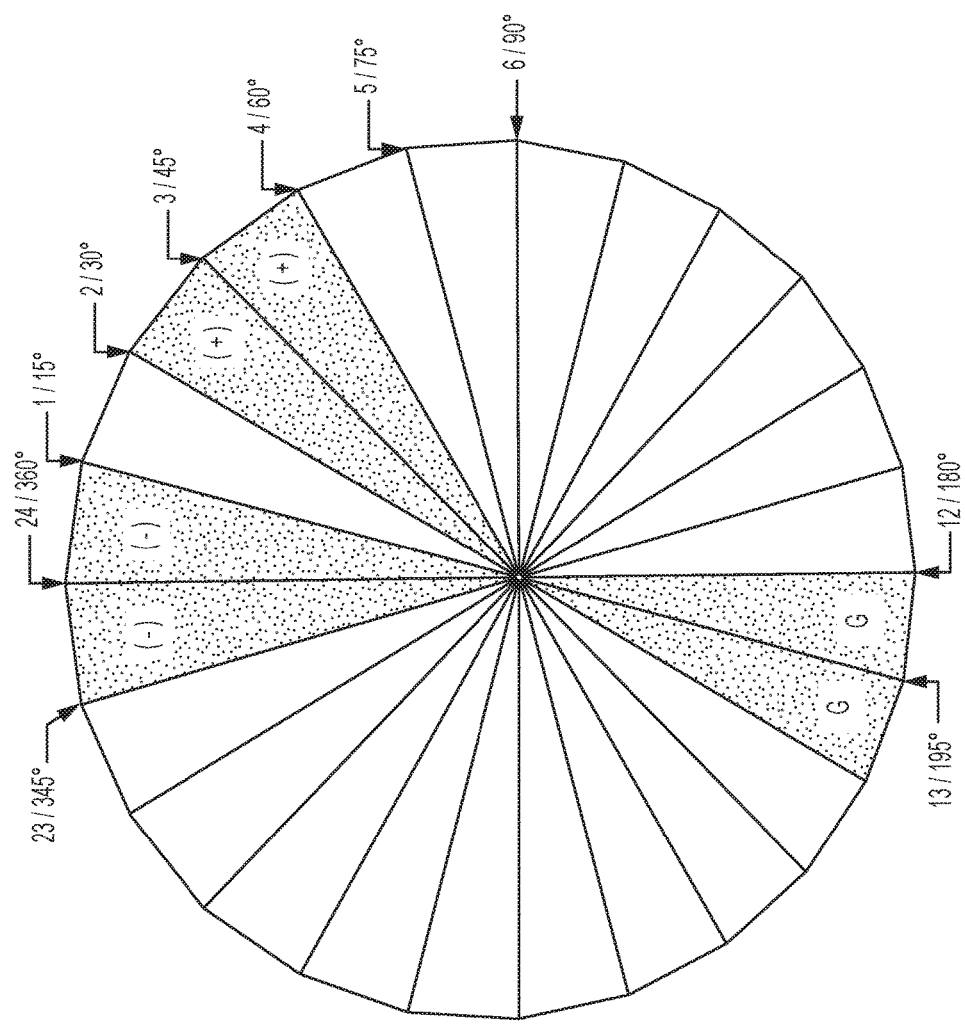
FIG. 7 shows a view of a commutator of a rotor as a 24-hour clock according to embodiments of the invention.

FIG. 7 illustrates a view of the strips or contacts 106 of a commutator 104 as a 24-hour clock according to a preferred embodiment of the present invention. The negative terminal (−) of the power input (i.e., battery) is connected to the 1st and 24th strips or contacts of the commutator, while the positive terminal (+) is connected to the 3rd and 4th strips or contacts of the commutator. Thus, the positive and negative terminals are about 10-20 degrees away from each other. This separation may be increased or decreased to improve power generation and may vary depending on size of the rotor. The power or electricity is generated through a terminal (G) to the 13th and 14th strips or contacts of the commutator. In a preferred embodiment, this terminal (G) for power generation occurs around 180 degrees from the negative terminal (−). In some embodiments, the terminal (G) is connected at the edge of the south-pole magnet, which is between 150-200 degrees from the negative terminal. Two strips are referenced per terminal because the width of the brushes causes two positions on the commutator to be touched at once. The outer magnetic field is not shown in this figure, but it should be noted that the position of the 1st strip is connected at the upper edge of the north-pole magnet field. The north-pole magnet field starts around the 24th strip and continues to the 10th strip and the south-pole magnet field starts at the 13th strip and goes until the 23rd strip. Thus, the positive terminal (+) is connected within the north-pole magnet field. These charged coils provide all the necessary positive/negative-attraction/repulsion interaction between the coils to sufficiently spin the rotor for current generation.

While other configurations are within the scope of the present invention, this configuration has been shown to produce significant power generation and has been shown to be the most efficient for current generation. By only using some of the coils to produce sufficient rotational movement of the rotor, the remaining coils can be used for current generation. As the "free" coils rotate in the magnetic field, the rotor generates current.

Figure 8:
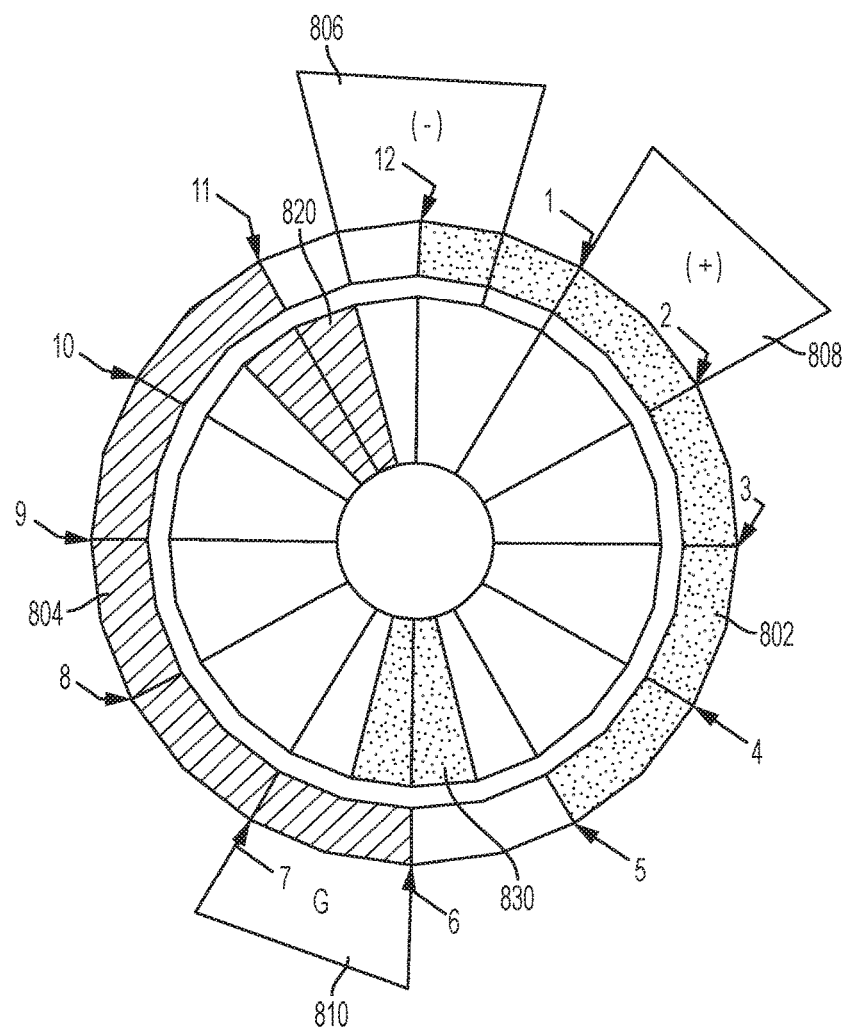
FIG. 8 shows a view of an alternative commutator of a rotor as a 12-hour clock according to embodiments of the invention.

FIG. 8 illustrates an alternative view of the strips or contacts 106 of a commutator 104 as a 12-hour clock according to a preferred embodiment of the present invention. The negative terminal (−) of the power input 806 is connected between the 11:30 and 12:30 positions, while the positive terminal (+) of the power input 808 is connected between the 1:00 and 2:00 positions. Traditional brushes are used at the negative 806 and positive 808 terminals. Reference numeral 802 represents the north-pole magnetic field and reference numeral 804 represents the south-pole magnetic field. The generated current is collected at a terminal 810 (G) between the 6:00 and 7:00 positions. As in FIG. 7, the negative terminal (−) 806 is connected to be aligned at the edge of the north-pole magnetic field 802, while the positive terminal (+) 808 is connected to be aligned within the north-pole magnetic field 802. The angle difference between the positive 808 and negative 806 terminals is about 10-20 degrees, and the power or electricity is collected about 180 degrees from the negative terminal 806. In some embodiments, the location of the positive and negative terminals is 5-40 degrees away from each other. Once energy is supplied and rotation has begun, electricity is being generated in the coils not involved in these two fields (+, −), which amounts to ten coils for generation. Electricity from these free coils is available for collection because they are in motion in a magnetic field, but not involved in the generation of a magnetic field. By harnessing these unused coils, the present invention generates more electricity or power from the spinning rotor than is supplied to the rotor.

FIG. 8 also illustrates the charged coils, which are represented by shading on the commutator. Specifically, a south-pole charged coil 820 is represented by shading of the commutator around 11 o'clock, and a north-pole charged coil 830 is represented by shading of the commutator around 6 o'clock. The power source charges the coils 820, 830. The remaining coils that are not shaded are "free" to rotate within the external magnetic field and generate electric power. The close positioning of the positive 808 and negative terminals 806 charge a small number of coils, which allows the others to generate electric power. Further, these charged coils 820, 830 are in a desired position to facilitate sufficient rotation of the rotor within the external magnetic field.

Figure 9:
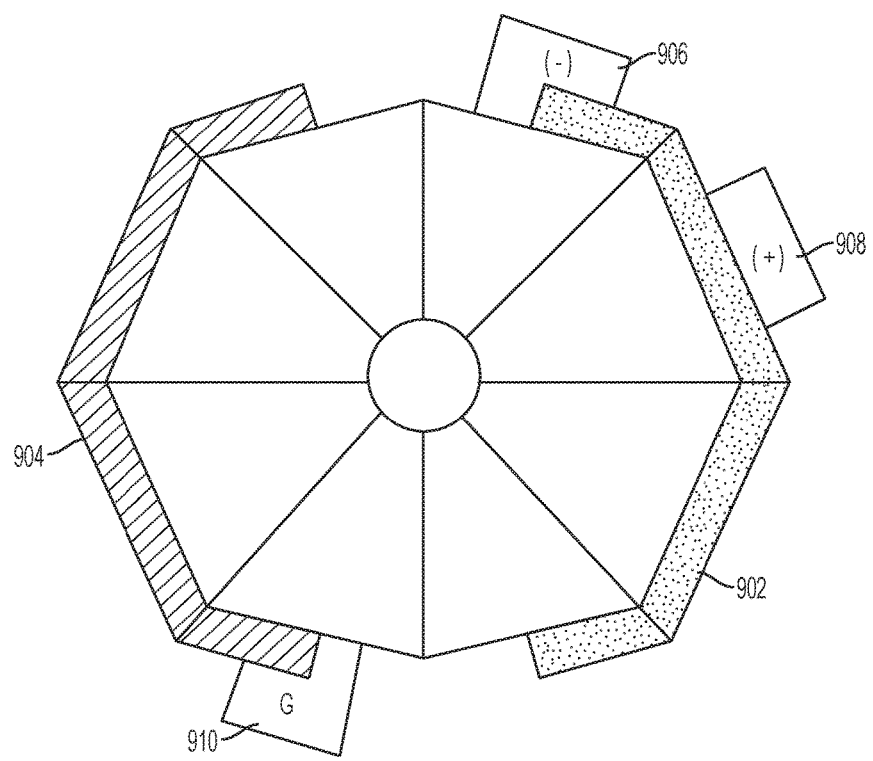
FIG. 9 shows a view of an alternative commutator of a rotor as an 8-hour clock according to embodiments of the invention.

FIG. 9 illustrates an alternative view of the strips or contacts 106 of an alternative commutator as an 8-hour clock according to a preferred embodiment of the present invention. The negative terminal (−) of the power input 906 is connected between the 12:30 and 1:00 positions, while the positive terminal (+) of the power input 908 is connected between the 2:00 and 2:30 positions. Reference numeral 902 represents the north-pole magnetic field and reference numeral 904 represents the south-pole magnetic field. The generated current (G) is collected at a terminal 910 between the 6:30 and 7:00 positions. In this embodiment, the negative terminal (−) 906 is connected on the edge of the north-pole magnetic field 902, while the positive terminal (+) 908 is connected within the north-pole magnetic field 902. Once energy is supplied and rotation has begun, electricity is being generated in the coils not involved in these two fields (+, −). Electricity from these free coils is available for collection because they are in motion in a magnetic field, but not being charged by the power supply.

The generator of the present invention can generate more electricity than is required to run. High levels of output have been obtained, indicating that multiple times more power is generated than is supplied by the power source. In some embodiments, an input of 12V and 2.0 amps can provide a production of approximately 45V and 4 amps. The power generated is over triple the input amount from the battery, but further modifications can raise it even more. For example, by adjusting the brushes, placement of the rotor within the magnetic field, and the placement of the rare-earth magnets, experiments have shown that the present invention can efficiently generate more than four times the electricity or power supplied by the battery.

Figure 10:
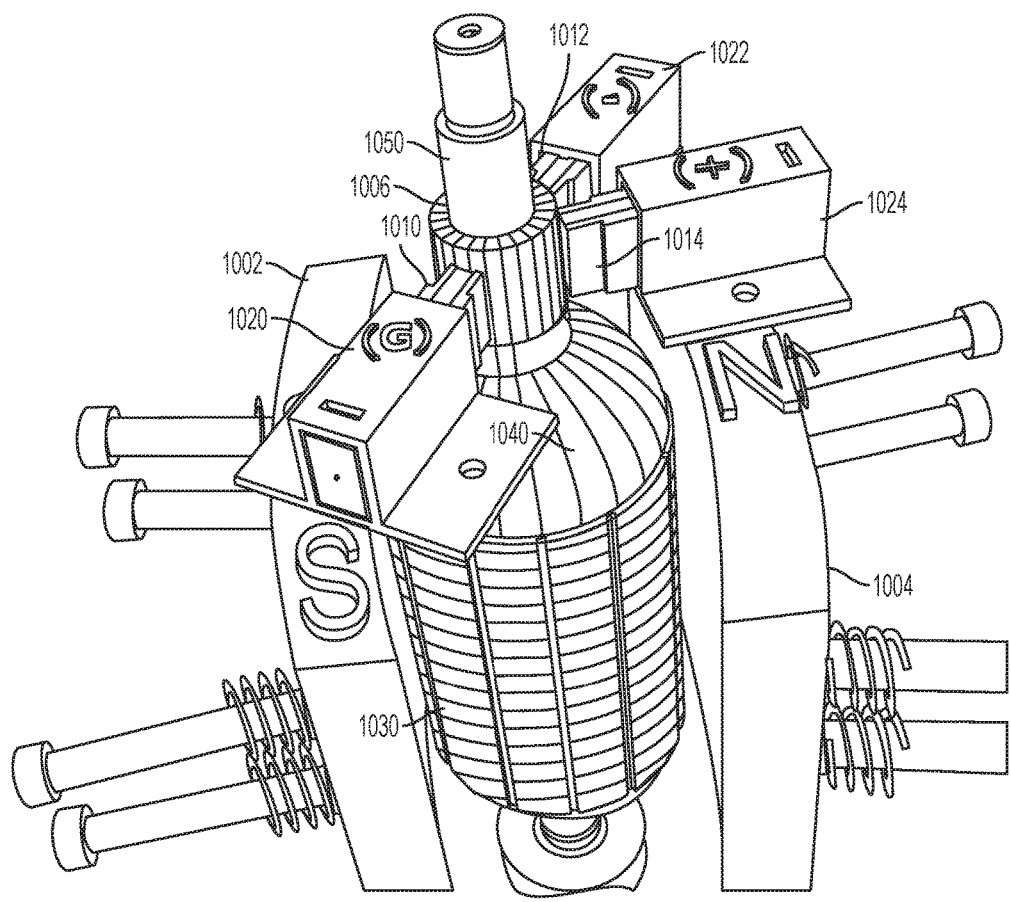
FIG. 10 shows an electric generator design according to embodiments of the invention.

FIG. 10 illustrates an alternative view of the placement of a rotor 1050 within the magnetic field and highlights the configuration of the brushes 1010, 1012, 1014 and the commutator 1006. The south-pole magnet(s) 1002 and the north-pole magnet(s) 1004 generate the magnetic field around the rotor 1050 and the rotor 1050 spins within that magnetic field. The rotor 1050 is offset towards the south-pole magnet(s) 1002. The negative terminal (−) brush 1012 and bracket 1022 are placed at the edge of the north-pole magnet(s) 1004 and the positive terminal (+) brush 1014 and bracket 1024 are placed within the north-pole magnet(s) 1004. The generated current (G) is collected at brush 1010 and bracket 1020, which is placed within the south-pole magnet(s) 1002. Similar to the figures above, the current (G) is collected about 150-200 degrees from the positive and negative terminals (+, −). Portions of the armature core 1030 and windings or coils 1040 on the rotor 1050 are also shown. The windings or coils 1040 that are not connected to and occupied by the power supply (+, −) are free to generate electricity as they move through the magnetic fields.

Figure 11:
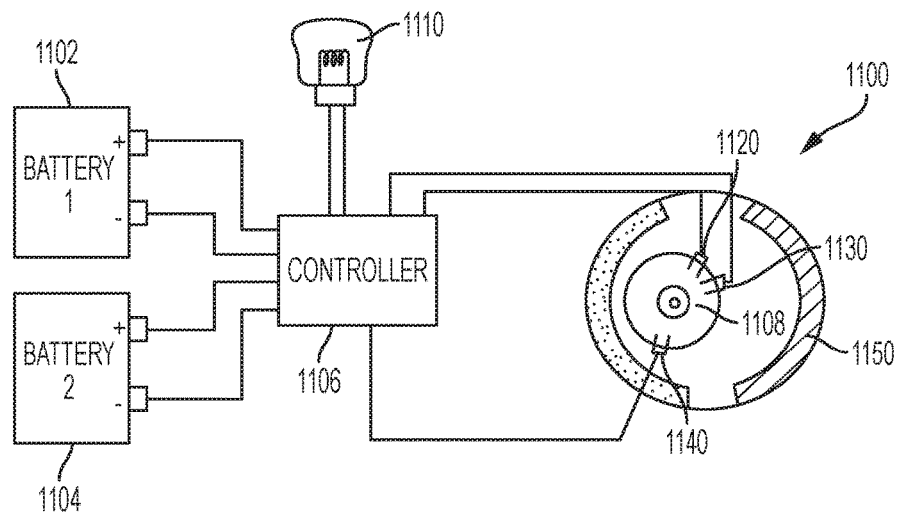
FIG. 11 shows an alternative electric generator design according to embodiments of the invention.

With its efficient power generation capabilities, there are many practical applications for the present invention. FIG. 11 illustrates an alternative electric generator 1100 design. In this design, two batteries are used to provide continuing power to a load, which is represented by a light bulb 1110 in this figure. A controller 1106 alternates between battery #1 1102 and battery #2 1104, so that only one battery is providing power to the rotor 1108 at any time. As discussed above, a rotor 1108 spins or rotates inside a housing 1150 with south and north-pole magnets to create a magnetic field for the rotor to rotate within. Battery #1 1102 and battery #2 1104 have positive and negative terminals that connect to the controller 1106. The controller 1106 switches from drawing power from battery #1 1102 to battery #2 1104. As one battery provides power to the rotor 1108, then the other battery is charged by the rotor 1108. Thus, when battery #1 1102 is providing power to the rotor 1104, the controller 1106 connects the positive and negative terminals of the battery to the positive 1130 and negative terminals 1120

(brushes) of the rotor 1108. During this time, the terminal 1140 (brush) that is collecting the power generated by the rotor 1108 is connected to battery #2 1104 by the controller 1106, so that it can charge, while battery #1 1102 supplies power to the rotor 1108. In some embodiments, the power generated by the rotor 1108 is four times the amount used to power the rotor, so the controller 1106 supplies the remaining power to the light bulb 1110 or other load. Then when battery #2 1104 is fully charged, the controller 1106 will switch the circuits such that battery #2 1104 is supplying power to the rotor 1108 and battery #1 1102 is being charged. This way the generator 1100 can continuously support a load 1110 by switching from one battery to the other. The present invention is not limited to this specific design and the number of power supplies or batteries and rotors can increase for various applications. However, this type of design enables a user to continuously power a load without connection to an external power source. This application could be used for home or remote power generation.

The shaft of the rotor 100 may also be used to power another motor. For example, a gear on the end of the shaft could be used to power an alternator, smaller vehicle, or any motor that requires mechanical input, although due to the limited number of activated coils the rotational power or strength of the rotor is limited. This mechanical power is in addition to the electric power generated by the electric generator. Thus, the user could use the rotor to power a motor or other electric generation system, while getting the added benefit of power or electricity generation. In some embodiments, the shaft could be connected to a gear to generate an additional 11 volts of electricity from the original 12-volt battery.

Figure 12:
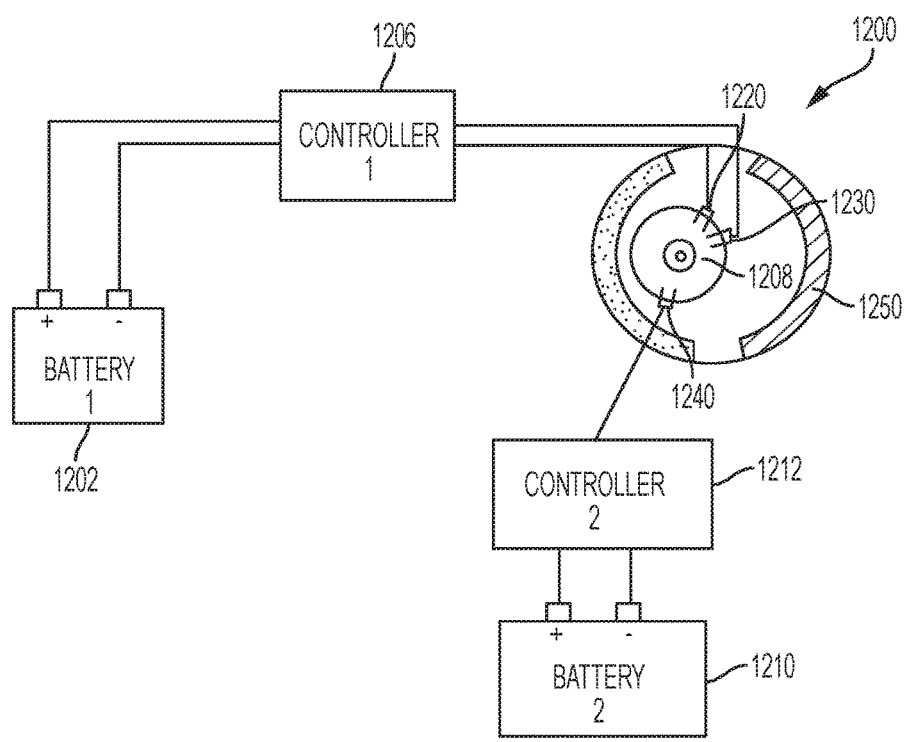
FIG. 12 shows an alternative electric generator design according to embodiments of the invention.

FIG. 12 illustrates an alternative electric generator 1200 design. In this design, a smaller battery #1 1202 provides power to a rotor 1208, which ultimately powers a larger battery #2 1210. A controller 1 1206 provides power from battery #1 1202 to the rotor 1208. The rotor 1208 spins or rotates inside a housing 1250 with south and north-pole magnets to create a magnetic field for the rotor to rotate in. Battery #1 1202 has positive and negative terminals that connect to the controller #1 1206 and the controller provides that power to the positive terminal 1230 and negative terminal 1220 of the rotor 1208. As the rotor 1208 spins in the magnetic field, power is generated and then collected by a controller #2 1212 at terminal 1240, which then supplies the power to a battery #2 1210. In some embodiments, the power generated by the rotor 1208 is four times the amount used to power the rotor, so the controller #2 1212 generates more power for battery #2 1210 than was supplied by battery #1 1202. Battery #2 1210 may comprise more than one battery, so that it may be charging and supplying electric power at the same time. This generator 1200 design could work with a car, as the alternator could keep battery #1 1202 charged, while battery #2 1210 could provide the necessary power to the car. This design 1200 could also work for remote oil and gas sites or home applications, where larger power sources are required. The present invention is not limited to this specific design and the number of batteries and rotors can increase for various applications. However, this type of design enables a user to charge a larger battery from a smaller power source.

FIG. 13 illustrates an alternative electric generator 1300 design. In this design, a battery 1302 is used to provide power to one or more loads, which in this figure are represented by light bulbs 1316, 1318, 1320. Battery 1302 has a positive and negative terminal that connects to a first controller 1306. The controller 1306 connects the positive and negative terminals of the battery 1302 to the positive 1330 and negative terminals 1320 (brushes) of a first rotor 1308. The power is collected at terminal 1340 (brush) and fed into a second controller 1312. At this point in the generator, the power generated by the rotor 1308 could be up to four times more than the power supplied by the battery 1302. The controller 1312 then feeds this power to a second rotor 1318 through a connection to the positive 1360 and negative terminals 1350 (brushes) of the second rotor 1318. The power created by the second rotor 1308 is collected at terminal 1370 (brush) and fed to a third controller 1314. This controller 1314 then supplies power to one or more loads, or in this figure one or more light bulbs 1316, 1318, 1320. The present invention is not limited to this specific design and the number of batteries and rotors can increase for various applications. However, this type of design enables a user to power a larger load or multiple loads with a single battery or power source. The application could be used for home or remote power generation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electric generator comprising:
   a rotor with a commutator, wherein said commutator has a first half section and a second half section;
   at least one magnet that is aligned with said first half section of said commutator and at least one oppositely charged magnet that is aligned with said second half section of said commutator, wherein said at least one magnet and said at least one oppositely charged magnet are configured to run along a portion of a longitudinal axis of the rotor and are located external to said rotor; and
   a power source for supplying power to said rotor with a first terminal and a second terminal, wherein said first terminal and said second terminal are connected to said first half section of said commutator.

2. The electric generator of claim 1, wherein said electric generator further comprises a third terminal for collecting electric power that is connected to said rotor within said second half section of said commutator.

3. The electric generator of claim 1, wherein said first terminal is connected to said first half section of said commutator adjacent to an interior portion of said at least one magnet and said second terminal is connected to said first half section of said commutator adjacent to a first edge of said at least one magnet.

4. The electric generator of claim 2, wherein said third terminal is connected to said second half section of said commutator adjacent to a first edge of said at least one oppositely charged magnet.

5. The electric generator of claim 2, where said second terminal and said third terminal are located between 150 and 200 degrees away on said commutator.

6. The electric generator of claim 1, wherein said rotor is configured to be closer to said at least one oppositely charged magnet than said at least one magnet.

7. The electric generator of claim 1, wherein said first terminal and said second terminal are located between 5 and 40 degrees away on said commutator.

8. The electric generator of claim 2 further comprising:
a second power source with a fourth terminal and a fifth terminal, wherein a controller is configured to enable said fourth terminal and said fifth terminal to be connected to said first half section of said commutator; and
wherein said power source and said second power source are connected to said controller for switching between a first state and a second state, wherein in said first state said controller enables said power source to supply power to said rotor, and in said second state said controller enables said second power source to supply power to said rotor.

9. The electric generator of claim 2, wherein said third terminal is connected to a load for supplying electric power to said load.

10. The electric generator of claim 2, further comprising:
at least one second power source with a fourth terminal, wherein said fourth terminal is connected to a controller; and
wherein said controller is connected to said third terminal for supplying power to said at least one second power source.

11. A generator, said generator comprising:
a housing with at least one magnet on a first side of said housing and at least one oppositely charged magnet on a second side of said housing;
a rotor with a commutator that is configured to rotate within said housing, wherein said commutator includes a first half section and a second half section;
a power supply for providing power to said rotor through at least one terminal that is connected to said first half section of said commutator; and
a generation terminal that is connected to a second half section of said commutator for collecting electric power;
wherein said rotor is configured to be closer to said at least one magnet than said at least one oppositely charged magnet.

12. The generator of claim 11, wherein said power supply is further connected to said first half section of said commutator through a second terminal.

13. The generator of claim 12, wherein said first terminal and said second terminal are adjacent to said at least one oppositely charged magnet and said generation terminal is adjacent to said at least one magnet.

14. The generator of claim 12, wherein said first terminal and said second terminal are located between 5 and 40 degrees away on said commutator.

15. The generator of claim 12, wherein said second terminal and said third terminal are located between 150 and 200 degrees away on said commutator.

16. The generator of claim 12 further comprising:
a second power supply with a third terminal, wherein a controller is configured to enable said fourth terminal to be connected to said first half section of said commutator; and
wherein said power supply and said second power supply are connected to said controller for switching between a first state and a second state, wherein in said first state said controller enables said power supply to supply power to said rotor, and in said second state said controller enables said second power supply to supply power to said rotor.

17. The generator of claim 12, wherein said third terminal is connected to a load for supplying electric power to said load.

18. The generator of claim 12, further comprising:
at least one second power supply with a third terminal, wherein said third terminal is connected to a controller; and
wherein said controller is connected to said generation terminal for supplying power to said at least one second power supply.

19. An electric generator, said electric generator comprising:
a rotor with a commutator;
at least one south-pole magnet and at least one north-pole magnet that are configured to create a magnetic field and are external to said rotor, wherein said rotor rotates between said magnets; and
a power source with a first and a second terminal, wherein said first terminal and said second terminal are connected to said commutator;
wherein electric power is collected at a generation terminal, that is connected to a said commutator;
wherein said second terminal is connected to said commutator adjacent to an edge of said at least one north-pole magnet, said first terminal is connected to said commutator adjacent to an interior portion of said at least one north-pole magnet, and said third terminal is connected to said commutator adjacent to said at least one south-pole magnet.

20. The electric generator of claim 19, wherein said second terminal and said third terminal are located between 150 and 200 degrees away on said commutator.

* * * * *